(12) United States Patent
Naito et al.

(10) Patent No.: US 9,909,661 B2
(45) Date of Patent: Mar. 6, 2018

(54) CARRIER, PLANETARY GEAR MECHANISM, TRANSMISSION, AND WORKING VEHICLE

(71) Applicant: KOMATSU LTD., Tokyo (JP)

(72) Inventors: Shinichi Naito, Yuuki (JP); Hiroyuki Inoue, Chigasaki (JP)

(73) Assignee: KOMATSU LTD., Tokyo (JP)

( * ) Notice: Subject to any disclaimer, the term of this patent is extended or adjusted under 35 U.S.C. 154(b) by 54 days.

(21) Appl. No.: 14/903,370

(22) PCT Filed: Jul. 16, 2014

(86) PCT No.: PCT/JP2014/068921
§ 371 (c)(1),
(2) Date: Jan. 7, 2016

(87) PCT Pub. No.: WO2015/072180
PCT Pub. Date: May 21, 2015

(65) Prior Publication Data
US 2016/0146337 A1 May 26, 2016

(30) Foreign Application Priority Data
Nov. 18, 2013 (JP) .................... 2013-238213

(51) Int. Cl.
*F16H 61/02* (2006.01)
*F16D 25/0638* (2006.01)
(Continued)

(52) U.S. Cl.
CPC ......... *F16H 61/0265* (2013.01); *F16D 21/06* (2013.01); *F16D 25/0638* (2013.01);
(Continued)

(58) Field of Classification Search
None
See application file for complete search history.

(56) References Cited

U.S. PATENT DOCUMENTS

| 5,846,153 A | 12/1998 | Matsuoka |
| 2007/0066440 A1 | 3/2007 | Kitahara et al. |

(Continued)

FOREIGN PATENT DOCUMENTS

| CN | 100460711 A | 2/2009 |
| DE | 818 732 C1 | 10/1951 |

(Continued)

OTHER PUBLICATIONS

The extended European search report for the corresponding European application No. 14861194.0, dated Jan. 25, 2017.
International Search Report for the corresponding international application No. PCT/JP2014/068921, dated Oct. 14, 2014.
The Office Action for the corresponding Chinese application No. 201480041153.9, dated Mar. 30, 2017.

*Primary Examiner* — Ramya P Burgess
*Assistant Examiner* — Timothy M Hannon
(74) *Attorney, Agent, or Firm* — Global IP Counselors, LLP (57) ABSTRACT

A carrier is provided with a circular plate section, a cylinder section, a planetary gear arrangement section, a first hydraulic fluid flow path, and a second hydraulic fluid flow path. The cylinder section has a second support section for supporting a support pin for a planetary gear, a first clutch attachment section for attaching to a first clutch, a second clutch attachment section for attaching to a second clutch, and a piston attachment section for attaching to a piston for driving the second clutch. The first hydraulic fluid flow path has a first inlet which is provided in the circular plate section to receive hydraulic fluid to lubricate the first clutch. The second hydraulic fluid flow path has a second inlet which is provided in the circular plate section to receive hydraulic fluid to drive the piston.

18 Claims, 5 Drawing Sheets

(51) Int. Cl.
*F16D 25/12* (2006.01)
*F16H 3/72* (2006.01)
*F16H 3/44* (2006.01)
*F16H 57/04* (2010.01)
*F16H 57/08* (2006.01)
*F16H 61/00* (2006.01)
*F16D 21/06* (2006.01)
*E02F 9/20* (2006.01)
*F16H 37/08* (2006.01)

(52) U.S. Cl.
CPC .............. *F16D 25/123* (2013.01); *F16H 3/44* (2013.01); *F16H 3/728* (2013.01); *F16H 57/0473* (2013.01); *F16H 57/0484* (2013.01); *F16H 57/082* (2013.01); *F16H 61/0003* (2013.01); *F16H 61/0025* (2013.01); *E02F 9/202* (2013.01); *F16H 2037/0873* (2013.01); *F16H 2200/2007* (2013.01); *F16H 2200/2046* (2013.01)

(56) References Cited

U.S. PATENT DOCUMENTS

| | | |
|---|---|---|
| 2007/0287575 A1 | 12/2007 | Hvolka et al. |
| 2009/0105028 A1 | 4/2009 | Hiraki et al. |
| 2010/0222173 A1 | 9/2010 | Diosi et al. |

FOREIGN PATENT DOCUMENTS

| | | |
|---|---|---|
| DE | 197 03 241 A1 | 11/1997 |
| EP | 1 808 619 A1 | 7/2007 |
| EP | 2 258 576 A1 | 12/2010 |
| JP | 6084442 A | 5/1985 |
| JP | 2007-113683 A | 10/2005 |
| JP | 2006-329244 A | 12/2006 |
| JP | 2008-545105 A | 12/2008 |
| NO | 2006/049034 A1 | 5/2006 |

| MODE | | Lo | | Hi | |
|---|---|---|---|---|---|
| | | L1 | L2 | H1 | H2 |
| MOTOR / GENERATOR | MG1 | M | M | G | G |
| | MG2 | G | G | M | M |
| | MG3 | M | G | M | G |
| CLUTCH | CL | O | O | X | X |
| | CH | X | X | O | O |
| | Cm1 | O | X | X | O |
| | Cm2 | X | O | O | X |

CARRIER, PLANETARY GEAR MECHANISM, TRANSMISSION, AND WORKING VEHICLE

CROSS-REFERENCE TO RELATED APPLICATIONS

This application is a U.S. National stage application of International Application No. PCT/JP2014/068921, filed on Jul. 16, 2014. This U.S. National stage application claims priority under 35 U.S.C. § 119(a) to Japanese Patent Application No. 2013-238213, filed in Japan on Nov. 18, 2013, the entire contents of which are hereby incorporated herein by reference.

BACKGROUND

Field of the Invention

The present invention relates to a carrier, a planetary gear mechanism, a transmission, and a working vehicle.

Planetary gear mechanisms and a plurality of clutches, which are for switching between connection and disconnection of rotation elements in the planetary gear mechanisms, are provided in a transmission. For example, a transmission which is provided with a first planetary gear mechanism and a second planetary gear mechanism is disclosed in Japanese Unexamined Patent Application Publication No. 2006-329244. In this transmission, connection and disconnection of a carrier of the second planetary gear mechanism and a housing is switched using a first clutch. In addition, connection and disconnection of a carrier of the second planetary gear mechanism and a ring gear in the first planetary gear mechanism is switched using a second clutch.

Not only planetary gears in the second planetary gear mechanism but also the first clutch and the second clutch are attached to the carrier described above. In addition, since a sun gear engages with the planetary gears, the sun gear is arranged to be close to the carrier. Furthermore, a piston for driving the first clutch and a piston for driving the second clutch are also arranged. It is preferable that these plurality of components are arranged in a compact manner in the surroundings of the carrier in order for the size of the transmission to be reduced.

In addition, a drive circuit for supplying hydraulic fluid to the pistons is necessary in order for the pistons to be driven using hydraulic pressure of the hydraulic fluid. Furthermore, a lubricating circuit for lubricating each of the clutches is also necessary. However, when the plurality of components described above are arranged in a compact manner in the surroundings of the carrier, it is not easy for the drive circuit and the lubricating circuit to be arranged to avoid these components. In addition, there is a problem in that the structure of the transmission becomes complicated and ease of assembly of the transmission is reduced due to arranging of the drive circuit and the lubricating circuit.

The problem of the present invention is to propose a carrier, a planetary gear mechanism, a transmission, and a working vehicle where it is possible to improve ease of assembly by suppressing complicating of the structure of the transmission while also reducing the size of the transmission.

A carrier according to a first aspect is a carrier to which a first clutch and a second clutch are attached and which is for supporting a planetary gear in a planetary gear mechanism. The carrier is provided with a circular plate section, a cylinder section, a planetary gear arrangement section, a first hydraulic fluid flow path, and a second hydraulic fluid flow path. The circular plate section has a first support section for supporting one end of a support pin for the planetary gear. The cylinder section is arranged to be separated from the circular plate section in the axial direction of the circular plate section. The cylinder section has a second support section for supporting the other end of the support pin for the planetary gear, a first clutch attachment section for attaching to the first clutch, a second clutch attachment section for attaching to the second clutch, and a piston attachment section for attaching to a piston for driving the second clutch. The planetary gear arrangement section is arranged between the circular plate section and the cylinder section in the axial direction. The planetary gear arrangement section has a space where the planetary gear is arranged. The first hydraulic fluid flow path has a first inlet which is provided in the circular plate section. The first hydraulic fluid flow path is provided at an inner section of the circular plate section and the cylinder section. Hydraulic fluid for lubricating the first clutch is supplied from the first inlet to the first clutch attachment section via the first hydraulic fluid flow path. The second hydraulic fluid flow path has a second inlet which is provided in the circular plate section. The second hydraulic fluid flow path is provided at an inner section of the circular plate section and the cylinder section. Hydraulic fluid for driving the piston is supplied from the second inlet to the piston attachment section via the second hydraulic fluid flow path.

In this case, the carrier supports not only the first clutch and the second clutch but also supports the piston. For this reason, it is possible for the transmission to be reduced in size and it is possible to simplify the structure of the transmission compared to a case where the piston support structure which is separate to the carrier is provided in the vicinity of the carrier.

In addition, it is possible for the second hydraulic fluid flow path, which is for driving the piston in the second clutch, to be provided in an inner section of the carrier since the carrier has the piston attachment section. Furthermore, it is possible for the first hydraulic fluid flow path, which is for lubricating the first clutch, to be provided in an inner section of the carrier since the carrier has the first clutch attachment section. Due to this, it is possible to simplify the structure of the transmission and it is possible to improve ease of assembly of the transmission.

Furthermore, the first inlet and the second inlet are both provided in the circular plate section. That is, the first inlet and the second inlet are arranged on the opposite side with regard to the planetary gear arrangement section and not in the cylinder section to which the first clutch, the second clutch, and the piston are attached. For this reason, it is possible to easily arrange the member for supplying hydraulic fluid to the first inlet and the second inlet by avoiding interference with the first clutch, the second clutch, the piston, and a sun gear which engages with the planetary gear or with components which relates to these.

It is preferable that the first inlet and the second inlet be arranged to be separated from each other in the axial direction of the carrier. In this case, it is possible to easily connect the hydraulic circuit in the separate systems with the first inlet and the second inlet. That is, it is possible to easily connect the hydraulic circuit which is appropriate for lubricating the clutch and the hydraulic circuit which is appropriate for driving the piston respectively with the first inlet and the second inlet.

It is preferable that the circular plate section have a hole which penetrates through the circular plate section at the center of the circular plate section. At least one of the first inlet and the second inlet is provided at an inner surface of the hole. In this case, since a shaft member, where a flow path is provided in an inner section, passes through the hole, it is possible for hydraulic fluid to be supplied to at least one of the first inlet and the second inlet via the flow path inside the shaft member.

It is preferable that the first hydraulic fluid flow path have a first upstream side flow path and a first downstream side flow path. The first upstream side flow path is provided in an inner section of the circular plate section and connects the first inlet and the first support section. The first downstream side flow path is provided in an inner section of the cylinder section. The first downstream side flow path connects the second support section and the first clutch attachment section. In this case, it is possible for hydraulic fluid to be supplied from the first inlet to the piston attachment section due to the first upstream side flow path and the first downstream side flow path being connected using a flow path which is provided in an inner section of the support pin.

It is preferable that the planetary gear arrangement section have a linking section which links the circular plate section and the cylinder section. The second hydraulic fluid flow path has a second upstream side flow path, a second downstream side flow path, and an intermediate flow path. The second upstream side flow path is provided in an inner section of the circular plate section. The second upstream side flow path is connected with the second inlet. The second downstream side flow path is provided in an inner section of the cylinder section. The second downstream side flow path is connected with the piston attachment section. The intermediate flow path is provided in an inner section of the linking section. The intermediate flow path connects the second upstream side flow path and the second downstream side flow path. In this case, it is possible for hydraulic fluid to be supplied from the second inlet to the piston attachment section via the second upstream side flow path which is in an inner section of the circular plate section, the intermediate flow path which is in an inner section of the linking section, and the second downstream side flow path which is in an inner section of the cylinder section.

It is preferable that the first hydraulic fluid flow path has a plurality of outlets, a first flow path, a merging flow path, and a plurality of second flow paths. The plurality of outlets are connected with the first clutch attachment section. The first flow path extends in the radial direction of the cylinder section. The merging flow path is connected with the first flow path and extends in the circumferential direction of the cylinder section. The plurality of second flow paths connect the merging flow path and the plurality of outlets. In this case, hydraulic fluid is efficiently sent to the merging flow path using the centrifugal force of the carrier since the first flow path extends in the radial direction of the cylinder section. Hydraulic fluid is sent to the plurality of second flow paths by being dispersed in the merging flow path. Then, hydraulic fluid is supplied from each of the plurality of second flow paths to the first clutch via the plurality of outlets. Due to this, it is possible to uniformly supply hydraulic fluid to the first clutch over a wide range.

It is preferable that the cylinder section has a first cylinder section and a second cylinder section. The first cylinder section includes the second support section and the piston attachment section. The second cylinder section is connected with the first cylinder section. The first clutch attachment section is provided on the outer circumference of the second cylinder section. The second clutch attachment section is provided on the inner circumference of the second cylinder section. In this case, it is possible for the first clutch, the second clutch, and the piston to be arranged in a compact manner in the vicinity of the carrier.

It is preferable that the first cylinder section and the second cylinder section be separate bodies. In this case, it is possible to easily manufacture the carrier even when the shape of the carrier becomes complicated.

A planetary gear mechanism according to a second aspect is provided with a sun gear, a planetary gear, the carrier described above, and a ring gear. The planetary gear engages with the sun gear. The carrier supports the planetary gear. The ring gear engages with the planetary gear and is provided so as to be able to rotate.

A transmission according to a third aspect is provided with a first clutch, a second clutch, and the planetary gear mechanism described above.

A working vehicle according to a fourth aspect is provided with an engine, a hydraulic pump, a working implement, a travel apparatus, and the transmission described above. The hydraulic pump is driven using the engine. The working implement is driven using hydraulic fluid which is discharged from the hydraulic pump. The travel apparatus is driven using drive force from the engine. The transmission transfers drive force from the engine to the travel apparatus.

According to exemplary embodiments of the present invention, it is possible to propose a carrier, a planetary gear mechanism, and a working vehicle where it is possible to improve ease of assembly by suppressing complicating of the structure of a transmission while also reducing the size of the transmission.

DETAILED DESCRIPTION OF EXEMPLARY EMBODIMENTS

Figure 1:
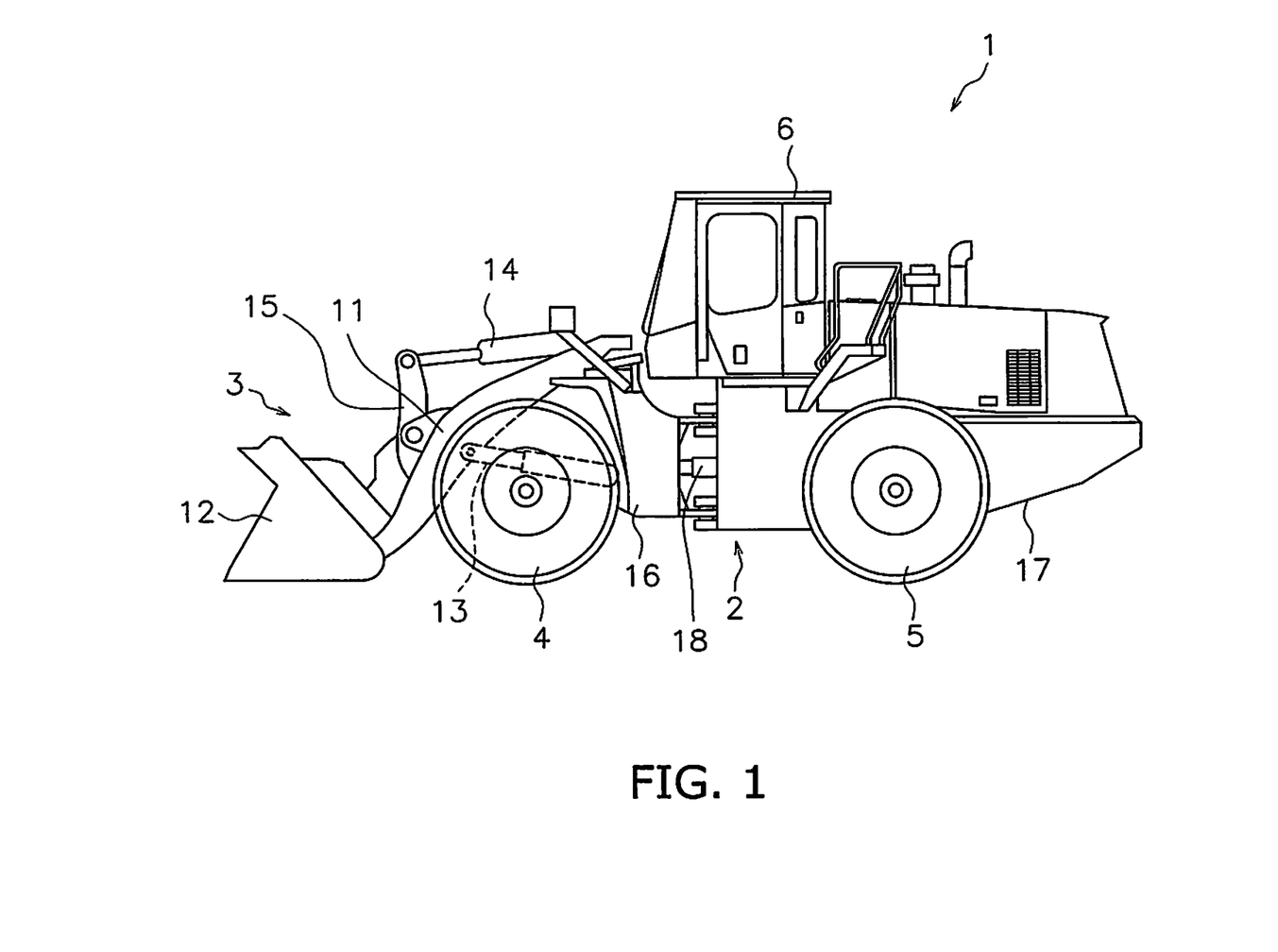
FIG. 1 is a side surface diagram of a working vehicle according to an exemplary embodiment of the present invention.

An exemplary embodiment of the present invention will be described below with reference to the diagrams. FIG. 1 is a side surface diagram of a working vehicle 1 according to an exemplary embodiment of the present invention. In the present exemplary embodiment, the working vehicle 1 is a wheel loader. The working vehicle 1 is provided with a vehicle frame 2, a working implement 3, travel wheels 4 and 5, and a driving cab 6 as shown in FIG. 1. The working vehicle 1 travels due to the travel wheels 4 and 5 being driven to rotate. It is possible for the working vehicle 1 to perform work, such as digging, using the working implement 3.

The working implement 3 and the travel wheel 4 are attached to the vehicle frame 2. The working implement 3 is driven using hydraulic fluid from a working implement pump 23 (refer to FIG. 2). The working implement 3 has a boom 11 and a bucket 12. The boom 11 is mounted on the vehicle frame 2. The working implement 3 has a lift cylinder 13 and a bucket cylinder 14. The lift cylinder 13 and the bucket cylinder 14 are hydraulic cylinders. One end of the lift cylinder 13 is attached to the vehicle frame 2. The other end of the lift cylinder 13 is attached to the boom 11. The boom 11 swings up and down by the lift cylinder 13 expanding and contracting due to hydraulic fluid from the working implement pump 23. The bucket 12 is attached to the tip end of the boom 11. One end of the bucket cylinder 14 is attached to the vehicle frame 2. The other end of the bucket cylinder 14 is attached to the bucket 12 via a bell crank 15. The bucket 12 swings up and down by the bucket cylinder 14 expanding and contracting due to hydraulic fluid from the working implement pump 23.

The driving cab 6 and the travel wheel 5 are attached to the vehicle frame 2. The driving cab 6 is placed on the vehicle frame 2. A seat where an operator sits, an operating apparatus which will be described later, and the like are arranged inside the driving cab 6. The vehicle frame 2 has a front frame 16 and a rear frame 17. The front frame 16 and the rear frame 17 are attached to each other to be able to swing in the left and right direction.

The working implement 3 is attached to the front frame 16. The driving cab 6 is placed on the rear frame 17. In addition, apparatuses, such as an engine 21 and a transmission 24 which will be described later and the like, are mounted on the rear frame 17. The transmission 24 is positioned in front of the engine 21.

The working vehicle 1 has a steering cylinder 18. The steering cylinder 18 is attached to the front frame 16 and the rear frame 17. The steering cylinder 18 is a hydraulic cylinder. The travelling direction of the working vehicle 1 changes to the left and right by the steering cylinder 18 expanding and contracting due to hydraulic fluid from a steering pump 30 which will be described later.

Figure 2:
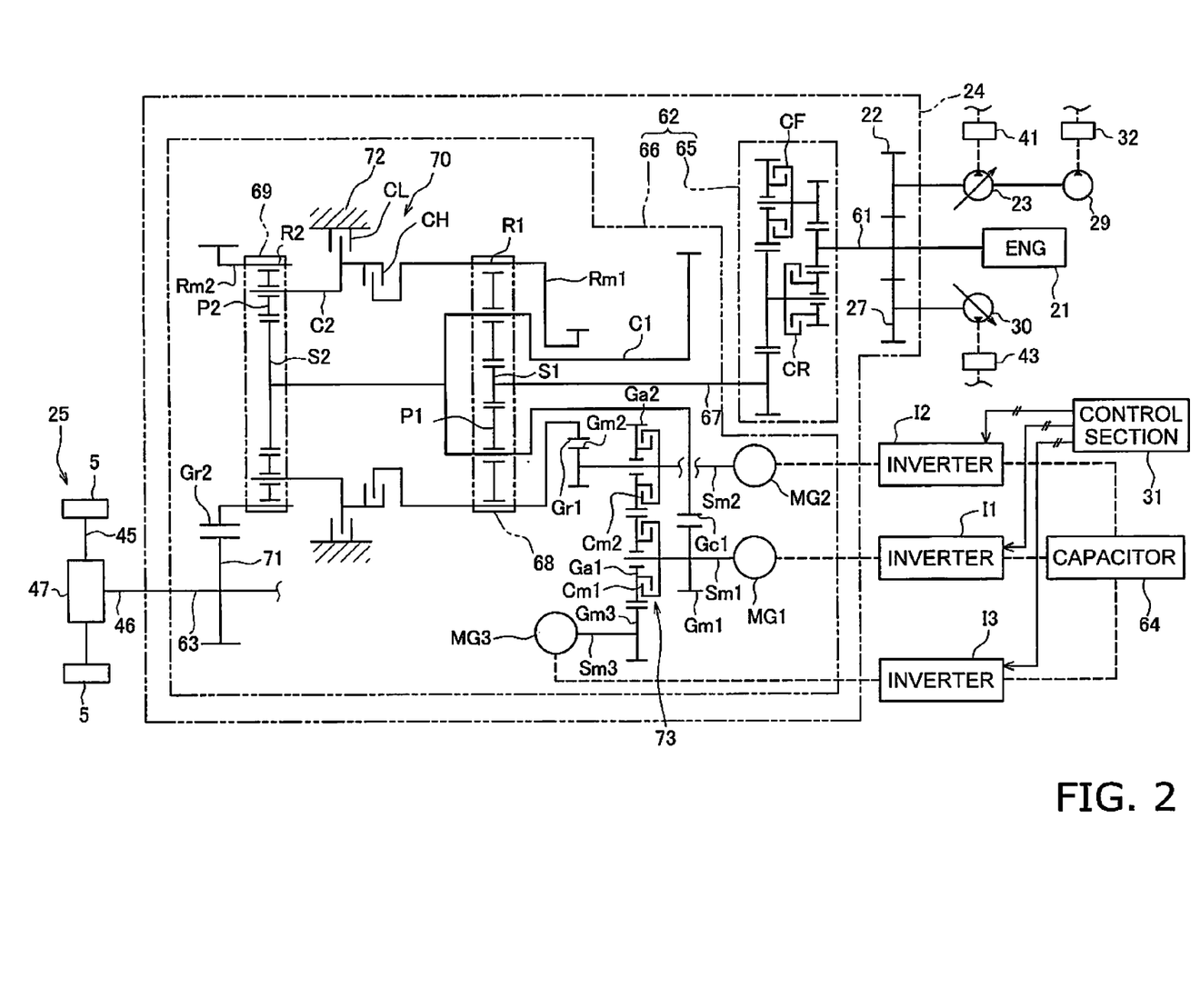
FIG. 2 is a schematic diagram illustrating the configuration of a working vehicle.

FIG. 2 is a schematic diagram illustrating the configuration of the working vehicle 1.

The working vehicle 1 is provided with the engine 21, the working implement pump 23, a transmission pump 29, the steering pump 30, the transmission 24, a travel apparatus 25, and the like as shown in FIG. 2.

The engine 21 is, for example, a diesel engine. The engine 21 generates drive force for driving the travel apparatus 25, the working implement pump 23, the transmission pump 29, the steering pump 30, and the like.

The working implement pump 23, the transmission pump 29, and the steering pump 30 are hydraulic pumps. The working implement pump 23, the transmission pump 29, and the steering pump 30 are driven using drive force from the engine 21.

The working implement pump 23 is a variable capacity type of hydraulic pump. Hydraulic fluid which is discharged from the working implement pump 23 is supplied to the lift cylinder 13 and the bucket cylinder 14 described above via a working implement control valve 41.

The transmission pump 29 is a fixed capacity type of hydraulic pump. Hydraulic fluid which is discharged from the transmission pump 29 is supplied to various types of clutches in the transmission 24 which will be described later via a clutch control valve 32.

The steering pump 30 is a variable capacity type of hydraulic pump. Hydraulic fluid which is discharged from the steering pump 30 is supplied to the steering cylinder 18 described above via a steering control valve 43.

The transmission 24 transfers drive force from the engine 21 to the travel apparatus 25. The transmission 24 applies gearing and outputs drive force from the engine 21. The configuration of the transmission 24 will be described later in detail.

The travel apparatus 25 is driven using the engine 21. The travel apparatus 25 has a transfer shaft 46, an axle shaft 45, and the travel wheel 5 described above. The transfer shaft 46 transfers drive force from the transmission 24 to the axle shaft 45. The axle shaft 45 extends in a vehicle width direction and is connected with the travel wheel 5. The axle shaft 45 transfers drive force from the transmission 24 to the travel wheel 5. Due to this, the travel wheel 5 is rotated.

The configuration of the transmission 24 will be described next in detail. The transmission 24 is provided with an input shaft 61, a first power takeoff mechanism 22 (referred to below as a "first PTO 22"), a second power takeoff mechanism 27 (referred to below as a "second PTO 22"), a gear mechanism 62, an output shaft 63, a first motor MG1, a second motor MG2, and a third motor MG3.

Rotation from the engine 21 is input to the input shaft 61. The gear mechanism 62 transfers rotation from the input shaft 61 to the output shaft 63. The output shaft 63 is connected with the travel apparatus 25 described above and transfers rotation from the gear mechanism 62 to the travel apparatus 25.

The first PTO 22 is connected with the input shaft 61 and transfers a portion of drive force from the engine 21 to the working implement pump 23 and the transmission pump 29. The second PTO 27 is connected with the input shaft 61 in parallel with the first PTO 22 and transfers a portion of drive force from the engine 21 to the steering pump 30.

The gear mechanism 62 is a mechanism which transfers drive force from the engine 21. The gear mechanism 62 is configured so that the rotation speed ratio of the output shaft 63 with regard to the input shaft 61 changes according to changes in the rotation speed of the motors MG1, MG2, and MG3. The gear mechanism 62 has a FR switching mechanism 65 and a gearing mechanism 66.

The FR switching mechanism 65 has a forward clutch CF, a reverse clutch CR, and various types of gears. The forward clutch CF and the reverse clutch CR are hydraulic clutches. The direction of rotation which is output from the FR switching mechanism 65 is switched due to switching between connection and disconnection of the forward clutch CF and connection and disconnection of the reverse clutch CR.

The gearing mechanism 66 has an intermediate shaft 67, a first planetary gear mechanism 68, a second planetary gear mechanism 69, a Hi/Lo switching mechanism 70, and an output gear 71. The intermediate shaft 67 is linked with the FR switching mechanism 65. The first planetary gear mechanism 68 and the second planetary gear mechanism 69 are arranged on the same shaft as the intermediate shaft 67.

The first planetary gear mechanism 68 has a first sun gear S1, a plurality of first planetary gears P1, a first carrier C1 which supports the plurality of first planetary gears P1, and a first ring gear member Rm1. The first sun gear S1 is linked with the intermediate shaft 67. The plurality of first planetary gears P1 engage with the first sun gear S1 and are supported by the first carrier C1 so as to be able to rotate. A first carrier gear Gc1 is provided on an outer circumference section of the first carrier C1. A first ring gear R1 is provided on the inner circumference of the first ring gear member Rm1. The first ring gear R1 engages with the plurality of planetary gears P1 and is able to rotate. In addition, a first ring outer circumference gear Gr1 is provided on the outer circumference of the first ring gear member Rm1.

The second planetary gear mechanism 69 has a second sun gear S2, a plurality of second planetary gears P2, a second carrier C2 which supports the plurality of second planetary gears P2, and a second ring gear member Rm2. The second sun gear S2 is linked with the first carrier C1. The plurality of second planetary gears P2 engage with the second sun gear S2 and are supported by the second carrier C2 so as to be able to rotate. A second ring gear R2 is provided on the inner circumference of the second ring gear member Rm2. The second ring gear R2 engages with the plurality of planetary gears P2 and is able to rotate. A second ring outer circumference gear Gr2 is provided on the outer circumference of the second ring gear member Rm2. The second ring outer circumference gear Gr2 engages with the output gear 71 and rotation from the second ring gear R2 is output to the output shaft 63 via the output gear 71.

The Hi/Lo switching mechanism 70 is a mechanism for switching a drive force transfer pathway in the transmission 24 between a high speed mode (Hi mode) where the vehicle speed is high and a low speed mode (Lo mode) where the vehicle speed is low. The Hi/Lo switching mechanism 70 has a second clutch CH which is on during the Hi mode and a first clutch CL which is on during the Lo mode. The second clutch CH connects or disconnects the first ring gear R1 and the second carrier C2. In addition, the first clutch CL connects or disconnects the second carrier C2 and a fixing end 72 and blocks or permits rotation of the second carrier C2.

Here, each of the clutches CH and CL are hydraulic clutches and hydratilic fluid from the transmission pump 29 is supplied respectively to each of the clutches CH and CL. Hydraulic fluid to each of the clutches CH and CL is controlled using the clutch control valve 32.

The first motor MG1, the second motor MG2, and the third motor MG3 function as drive motors which generate drive force using electrical energy. In addition, the first motor MG1, the second motor MG2, and the third motor MG3 also function as generators which generate electrical energy using drive force which is input.

A first motor gear Gm1 is fixed to a rotation shaft Sm1 in the first motor MG1. The first motor gear Gm1 engages with the first carrier gear Gc1. A second motor gear Gm2 is fixed to a rotation shaft Sm2 in the second motor MG2. The second motor gear Gm2 engages with the first ring outer circumference gear Gr1.

The third motor MG3 assists the first motor MG1 and the second motor MG2. The gearing mechanism 66 has a motor switching mechanism 73 and the motor switching mechanism 73 switches the target which the third motor MG3 assists selectively between the first motor MG1 and the second motor MG2.

In detail, the motor switching mechanism 73 has a first motor clutch Cm1, a second motor clutch Cm2, a first connecting gear Ga1, and a second connecting gear Ga2. A third motor gear Gm3 is connected with a rotation shaft Sm3 of the third motor MG3 and the third motor gear Gm3 engages with the first connecting gear Ga1. The first motor clutch Cm1 switches between connection and disconnection of the rotation shaft Sm1 of the first motor MG1 and the first connecting gear Ga1. The first connecting gear Ga1 engages with the second connecting gear Ga2. The second motor clutch Cm2 switches between connection and disconnection of the rotation shaft Sm2 of the second motor MG2 and the second connecting gear Ga2.

The first motor clutch Cm1 and the second motor clutch Cm2 are hydraulic clutches. Hydraulic fluid from the transmission pump 29 is supplied respectively to each of the motor clutches Cm1 and Cm2. Hydraulic fluid to each of the motor clutches Cm1 and Cm2 is controlled using the clutch control valve 32.

The third motor gear Gm3 assists the first motor MG1 in a state where the first motor clutch Cm1 is connected and the second motor clutch Cm2 is disconnected. The third motor gear Gm3 assists the second motor MG2 in a state where the second motor clutch Cm2 is connected and the first motor clutch Cm1 is disconnected.

The first motor MG1 is connected with a capacitor 64 via a first inverter I1. The second motor MG2 is connected to the capacitor 64 via a second inverter I2. The third motor MG3 is connected with the capacitor 64 via a third inverter I3.

The capacitor 64 functions as an energy retaining section which stores energy which is generated by the motors MG1, MG2, and MG3. That is, the capacitor 64 stores electrical power which is generated by each of the motors MG1, MG2, and MG3 when the total amount of electrical power generated by each of the motors MG1, MG2, and MG3 is large. In addition, the capacitor 64 discharges power when the total amount of electrical power consumed by each of the motors MG1, MG2, and MG3 is large. That is, each of the motors MG1, MG2, and MG3 are driven using electrical power which is stored in the capacitor 64. Here, a battery may be used as the electricity storage means instead of the capacitor.

The working vehicle 1 is provided with a control section 31. The control section 31 applies command signals, which express command torque to each of the motors MG1, MG2, and MG3, to the respective inverters I1, I2, and I3. In addition, the control section 31 applies command signals, which are for controlling the clutch hydraulics for each of the clutches CF, CR, CH, CL, Cm1, and Cm2, to the clutch control valve 32. The clutch control valve 32 includes a plurality of valves for controlling each of the clutches CF, CR, CH, CL, Cm1, and Cm2.

The gearing ratio and output torque of the transmission 24 is controlled by controlling the motors MG1, MG2, and MG3 and the clutches CF, CR, CH, CL, Cm1, and Cm2 using command signals from the control section 31. The operations of the transmission 24 will be described below.

Figure 3:
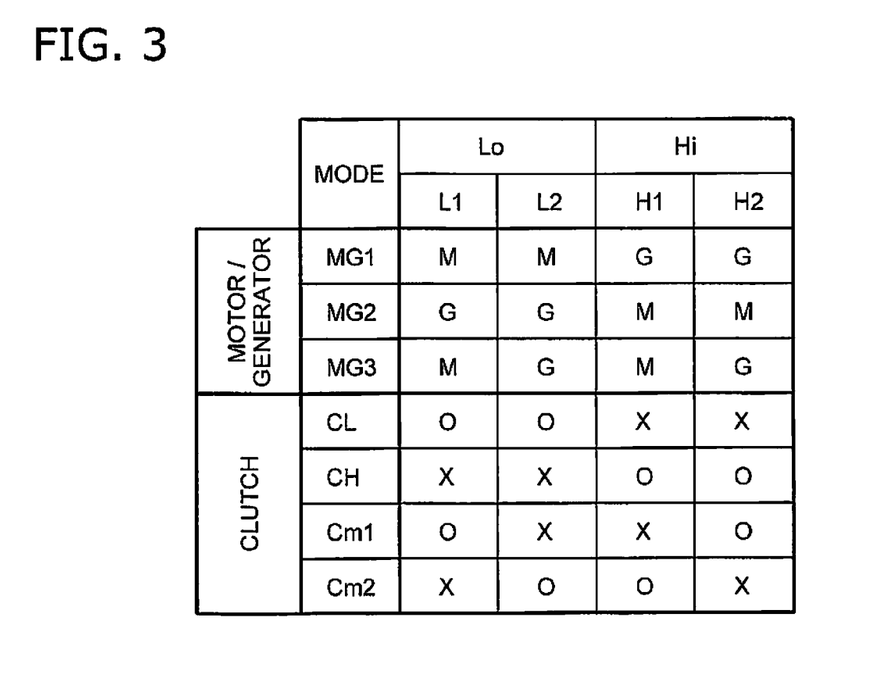
FIG. 3 is a table illustrating functions of first to third motors and the states of each clutch.

Here, basic operations of the transmission 24 will be described using FIG. 3 and FIG. 4 in a case where the vehicle speed is accelerating forward from zero while the rotation speed of the engine 21 is maintained to be constant. FIG. 3 shows functions of the motors MG1, MG2, and MG3 and the states of the clutches in each mode. The Lo mode has an L1 mode and an L2 mode. The Hi mode has an H1 mode and an H2 mode. In FIG. 3, "M" has the meaning of the motors MG1, MG2, and MG3 functioning as a drive motor. "G" has the meaning of the motors MG1, MG2, and MG3 functioning as a generator. "O" has the meaning of the clutch being in a state of connection. "X" has the meaning of the clutch being in a state of disconnection.

Figure 4:
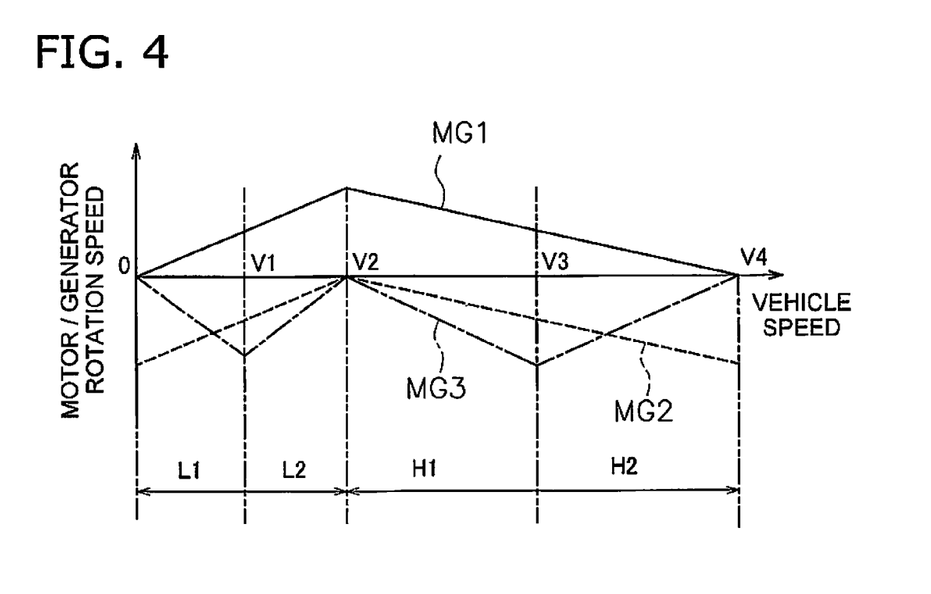
FIG. 4 is a diagram illustrating changes in rotation speeds of first to third motors with regard to vehicle speed.

FIG. 4 shows the rotation speeds of each of the motors MG1, MG2, and MG3 with regard to vehicle speed. In a case where the rotation speed of the engine 21 is constant, the vehicle speed changes according to the rotation speed ratio of the transmission 24. The rotation speed ratio is the ratio of the rotation speed of the output shaft 63 with regard to the rotation speed of the input shaft 61. Accordingly, changes in vehicle speed in FIG. 4 coincide with changes in the rotation speed ratio of the transmission 24. That is, FIG. 4 shows the relationship between the rotation speeds of each of the motors MG1, MG2, and MG3 and the rotation speed ratio of the transmission 24. In FIG. 4, the solid line indicates the rotation speed of the first motor MG1, the dashed line indicates the rotation speed of the second motor MG2, and the one-dot chain line indicates the rotation speed of the third motor MG3.

Over the range where the vehicle speed is equal to or more than zero and less than V1, the first clutch CL is connected, the second clutch CH is disconnected, the first motor clutch Cm1 is connected, and the second motor clutch Cm2 is disconnected (L1 mode). Since the second clutch CH is disconnected, the second carrier C2 and the first ring gear R1 are disconnected. Since the first clutch CL is connected, the second carrier C2 is fixed. In addition, the first connecting gear Ga1 is connected with the rotation shaft Sm1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the L1 mode, the drive force from the engine 21 is input into the first sun gear S1 via the intermediate shaft 67 and this drive force is output from the first carrier C1 to the second sun gear S2. On the other hand, the drive force which is input into the first sun gear S1 is transferred from the first planetary gears P1 to the first ring gear R1 and is output to the second motor MG2 via the first ring outer circumference gear Gr1 and the second motor gear Gm2. In the L1 mode, the second motor MG2 mainly functions as a generator and a portion of the electrical power which is generated by the second motor MG2 is stored in the capacitor 64.

In addition, the first motor MG1 and the third motor MG3 mainly function as electric motors in the L1 mode. The drive force from the first motor MG1 and the third motor MG3 is output to the second sun gear S2 using a pathway of the first motor gear Gm1→the first carrier gear Gc1→the first carrier C1. The drive force which is output to the second sun gear S2 in the manner described above is transferred to the output shaft 63 using a pathway of the second planetary gears P2→the second ring gear R2→the second ring outer circumference gear Gr2→the output gear 71.

Over the range where the vehicle speed is equal to or more than V1 and less than V2, the first clutch CL is connected, the second clutch CH is disconnected, the first motor clutch Cm1 is disconnected, and the second motor clutch Cm2 is connected (L2 mode). Accordingly, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the L2 mode, the drive force from the engine 21 is input into the first sun gear S1 via the intermediate shaft 67 and this drive force is output from the first carrier C1 to the second sun gear S2. On the other hand, the drive force which is input into the first sun gear S1 is transferred from the first planetary gears P1 to the first ring gear R1 and is output to the second motor MG2 via the first ring outer circumference gear Gr1 and the second motor gear Gm2. In addition, drive force is output from the second motor gear Gm2 to the third motor MG3 via the second motor clutch Cm2, the second connecting gear Ga2, the first connecting gear Ga1, and the third motor gear Gm3. In the L2 mode, the second motor MG2 and the third motor MG3 mainly function as generators and a portion of the electrical power which is generated by the second motor MG2 and the third motor MG3 is stored in the capacitor 64.

In addition, the first motor MG1 mainly functions as an electric motor in the L2 mode. The drive force from the first motor MG1 is output to the second sun gear S2 using a pathway of the first motor gear Gm1→the first carrier gear Gc1→the first carrier C1. The drive force which is output to the second sun gear S2 in the manner described above is transferred to the output shaft 63 using a pathway of the second planetary gears P2→the second ring gear R2→the second ring outer circumference gear Gr2→the output gear 71.

Over the range where the vehicle speed is equal to or more than V2 and less than V3, the first clutch CL is disconnected, the second clutch CH is connected, the first motor clutch Cm1 is disconnected, and the second motor clutch Cm2 is connected (H1 mode). Since the second clutch CH is connected in the H1 mode, the second carrier C2 and the first ring gear R1 are connected. In addition, since the first clutch CL is disconnected, the second carrier C2 is released. Accordingly, the rotation speeds of the first ring gear R1 and the second carrier C2 coincide. In addition, the second connecting gear Ga2 is connected with the rotation shaft Sm2 of the second motor MG2 and the first connecting gear Ga1 is disconnected from the rotation shaft Sm1 of the first motor MG1. Due to this, the third motor MG3 is connected with the second motor MG2 via the third motor gear Gm3, the first connecting gear Ga1, the second connecting gear Ga2, and the second motor clutch Cm2. In addition, since the first motor clutch Cm1 is disconnected, the third motor MG3 is disconnected from the first motor MG1.

In the H1 mode, the drive force from the engine 21 is input into the first sun gear S1 and this drive force is output from the first carrier C1 to the second sun gear S2. In addition, the drive force which is input into the first sun gear S1 is output from the first carrier C1 to the first motor MG1 via the first carrier gear Gc1 and the first motor gear Gm1. In the H1 mode, since the first motor MG1 mainly functions as a generator, a portion of the electrical power which is generated by the first motor MG1 is stored in the capacitor 64.

In addition, the second motor MG2 and the third motor MG3 mainly function as electric motors in the H1 mode. The drive force from the third motor MG3 is transferred from the third motor gear Gm3 to the rotation shaft Sm2 of the second motor MG2 via the first connecting gear Ga1, the second connecting gear Ga2, and the second motor clutch Cm2. Then, the drive force from the second motor MG2 and the drive force from the third motor MG3 is output to the second carrier C2 using a pathway of the second motor gear Gm2→the first ring outer circumference gear Gr1→the first ring gear R1→the second clutch CH. The drive force which is output to the second sun gear S2 in the manner described above is output to the second ring gear R2 via the second planetary gears P2 and the drive force which is output to the second carrier C2 is output to the second ring gear R2 via the second planetary gears P2. The drive force which is combined using the second ring gear R2 in this manner is transferred to the output shaft 63 via the second ring outer circumference gear Gr2 and the output gear 71.

Over the range where the vehicle speed is equal to or more than V3 and less than V4, the first clutch CL is disconnected, the second clutch CH is connected, the first motor clutch Cm1 is connected, and the second motor clutch Cm2 is disconnected (H2 mode). In the H2 mode, the first connecting gear Ga1 is connected with the rotation shaft Sm1 of the first motor MG1 and the second connecting gear Ga2 is disconnected from the rotation shaft Sm2 of the second motor MG2. Due to this, the third motor MG3 is connected with the first motor MG1 via the third motor gear Gm3, the first connecting gear Ga1, and the first motor clutch Cm1. In addition, since the second motor clutch Cm2 is disconnected, the third motor MG3 is disconnected from the second motor MG2.

In the H2 mode, the drive force from the engine 21 is input into the first sun gear S1 and this drive force is output from the first carrier C1 to the second sun gear S2. In addition, the drive force which is input into the first sun gear S1 is output from the first carrier C1 to the first motor MG1 and the third motor MG3 via the first carrier gear Gc1 and the first motor gear Gm1. In the H2 mode, since the first motor MG1 and the third motor MG3 mainly function as generators, a portion of the electrical power which is generated by the first motor MG1 and the third motor MG3 is stored in the capacitor 64.

In addition, the second motor MG2 mainly functions as an electric motor in the H2 mode. The drive force from the second motor MG2 is output to the second carrier C2 using a pathway of the second motor gear Gm2→the first ring outer circumference gear Gr1→the first ring gear R1→the second clutch CH. The drive force which is output to the second sun gear S2 in the manner described above is output to the second ring gear R2 via the second planetary gears P2 and the drive force which is output to the second carrier C2 is output to the second ring gear R2 via the second planetary gears P2. The drive force which is combined using the second ring gear R2 in this manner is transferred to the output shaft 63 via the second ring outer circumference gear Gr2 and the output gear 71.

Here, the above is a description of when driving forward but the operations are the same when driving in reverse.

Figure 5:
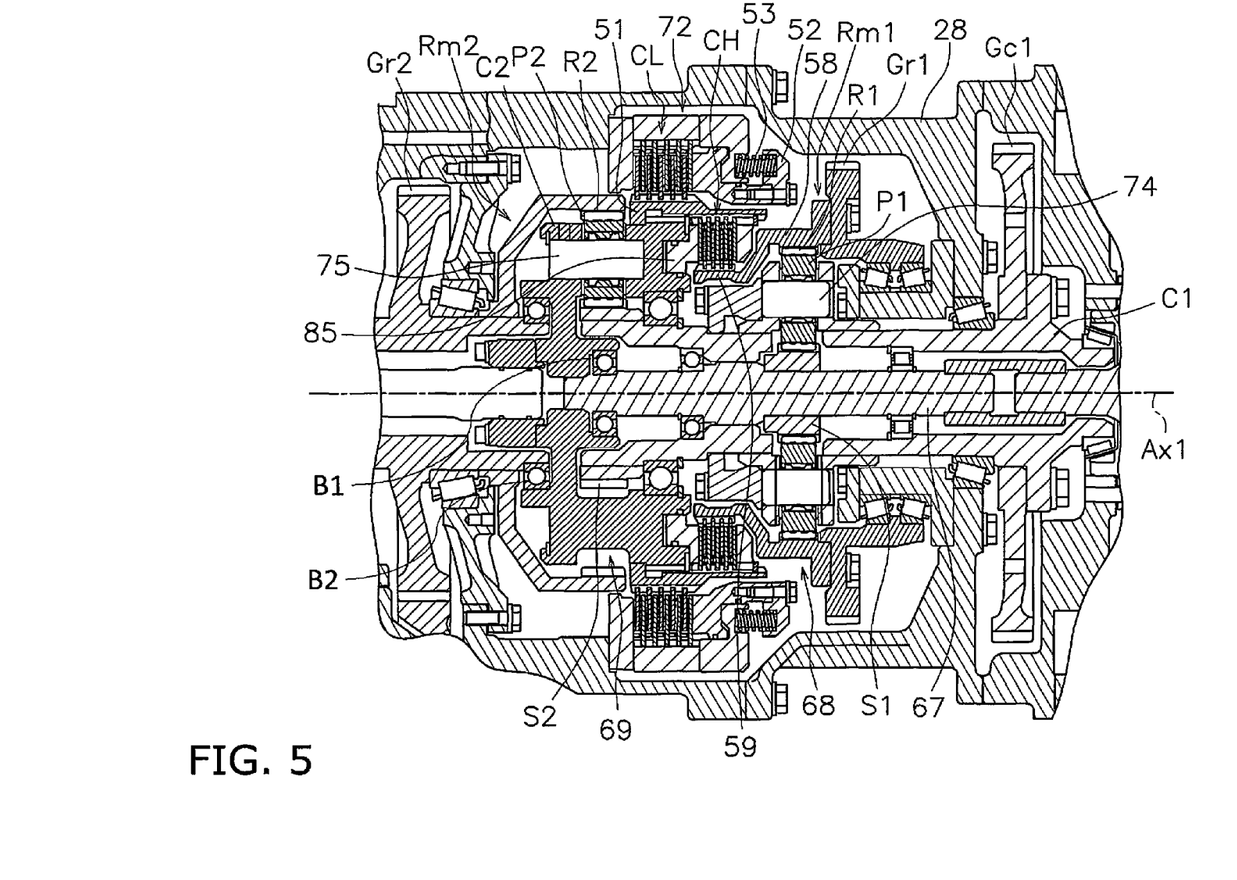
FIG. 5 is a cross sectional diagram of a portion of a transmission.

Next, the structure of the transmission 24 will be described. FIG. 5 is a diagram illustrating a portion of a cross section of the transmission 24. The transmission 24 has a housing 28 as shown in FIG. 5. The housing 28 accommodates the first planetary gear mechanism 68 and the second planetary gear mechanism 69. The second planetary gear mechanism 69 is arranged concentrically with the first planetary gear mechanism 68. The second planetary gear mechanism 69 is arranged to be separated from the first planetary gear mechanism 68 in the axial direction of the first planetary gear mechanism 68 (refer to one-dot chain line Ax1).

The first sun gear S1 is linked with the intermediate shaft 67. The first planetary gears P1 is arranged on the outside of the first sun gear S1 in the radial direction. The first carrier C1 supports the first planetary gears P1 via a first support pin 74 so as to be able to rotate. The first ring gear member Rm1 is positioned on the outside of the first carrier C1 and the first planetary gears P1 in the radial direction. The first ring gear R1 is arranged on the outside of the first planetary gears P1 in the radial direction.

The second sun gear S2 is linked with the first carrier C1. The second planetary gears P2 is arranged on the outside of the second sun gear S2 in the radial direction. The second planetary gears P2 is supported by the second carrier C2 via a second support pin 75 so as to be able to rotate. The second ring gear member Rm2 is positioned on the outside of the second carrier C2 and the second planetary gears P2 in the radial direction. The second ring gear R2 is arranged on the outside of the second planetary gears P2 and the second carrier C2 in the radial direction.

Here, on the outside in the radial direction in the present exemplary embodiment has the meaning of a direction of separating from an axis Ax1 of the first planetary gear mechanism 68 and the second planetary gear mechanism 69 in the radial direction. In addition, on the inside in the radial direction in the present exemplary embodiment has the meaning of a direction of moving closer to the axis Ax1 of the first planetary gear mechanism 68 and the second planetary gear mechanism 69 in the radial direction.

The first clutch CL and the second clutch CH are arranged between the first planetary gear mechanism 68 and the second planetary gear mechanism 69 in the axial direction. The first clutch CL is arranged between the second clutch CH and the second planetary gear mechanism 69 in the axial direction. In detail, the first clutch CL is arranged between the second clutch CH and the second planetary gears P2 in the axial direction. The second clutch CH is arranged between the first clutch CL and the first planetary gear mechanism 68 in the axial direction. In detail, the second clutch CH is arranged between the first clutch CL and the first planetary gears P1 in the axial direction. The second clutch CH has an outer diameter which is smaller than the outer diameter of the first clutch CL. The first clutch CL is arranged on the outside of the second carrier C2 in the radial direction. The second clutch CH is arranged on the outside of the first ring gear member Rm1 in the radial direction.

The first clutch CL has a plurality of clutch plates. The plurality of clutch plates are arranged to line up in the axial direction. A portion of the plurality of clutch plates are attached so as to be able to move with regard to the fixing end 72 in the axial direction. The fixing end 72 is fixed to the housing 28. The remaining clutch plates out of the plurality of clutch plates are attached so as to able to move with regard to the second carrier C2 in the axial direction and to rotate along with the second carrier C2.

The transmission 24 has a first piston 52 and a return spring 53. The first piston 52 is configured so that the first clutch CL is connected by applying pressure to the clutch plates of the first clutch CL. The first piston 52 lines up with the first clutch CL in the axial direction and is arranged on the outside of the second clutch CH in the radial direction. A portion of the first piston 52 is arranged on the outside of the first planetary gear mechanism 68 in the radial direction. In detail, a portion of the first piston 52 is arranged on the outside of the first planetary gear PI of the first planetary gear mechanism 68 in the radial direction.

The return spring 53 lines up with the first clutch CL in the axial direction and is arranged on the outside of the second clutch CH in the radial direction. The return spring 53 presses so that the first piston 52 separates from the first clutch CL. The return spring 53 is a coil spring.

The second clutch CH has a plurality of clutch plates. The plurality of clutch plates are arranged to line up in the axial direction. A portion of the plurality of clutch plates are attached to the second carrier C2 so as to be able to move with regard to the second carrier C2 in the axial direction and to rotate along with the second carrier C2. The remaining clutch plates out of the plurality of clutch plates are provided to be able to move with regard to the first ring gear member Rm1 in the axial direction and to rotate along with the first ring gear member Rm1.

In detail, the first ring gear member Rm1 has a first ring gear cylinder section 58 and a second ring gear cylinder section 59. The first ring gear RI described above is provided on the inner circumference of the first ring gear cylinder section 58. The outer diameter of the second ring gear cylinder section 59 is smaller than the outer diameter of the first ring gear cylinder section 58. The second ring gear cylinder section 59 is arranged to the inside of the second carrier C2 in the radial direction. A portion of the plurality of clutch plates of the second clutch CH are attached on the outer circumference of the second ring gear cylinder section 59.

Here, the outer diameter of the first ring outer circumference gear Gr1 described above is larger than the outer diameter of the first ring gear cylinder section 58. The outer diameter of the first ring outer circumference gear Gr1 is larger than the outer diameter of the second carrier C2. The first piston 52 is positioned on the outside of the first ring gear cylinder section 58 in the radial direction. The first piston 52 lines up with the first ring outer circumference gear Gr1 in the axial direction.

The transmission 24 has a second piston 85. The second piston 85 is configured so that the second clutch CH is connected by applying pressure to the plurality of clutch plates of the second clutch CH. The second piston 85 is arranged to line up with the second clutch CH in the axial direction. The second piston 85 is arranged on the inside of the first clutch CL in the radial direction. The second piston 85 is arranged on the inside of the second clutch CH in the radial direction.

Figure 6:
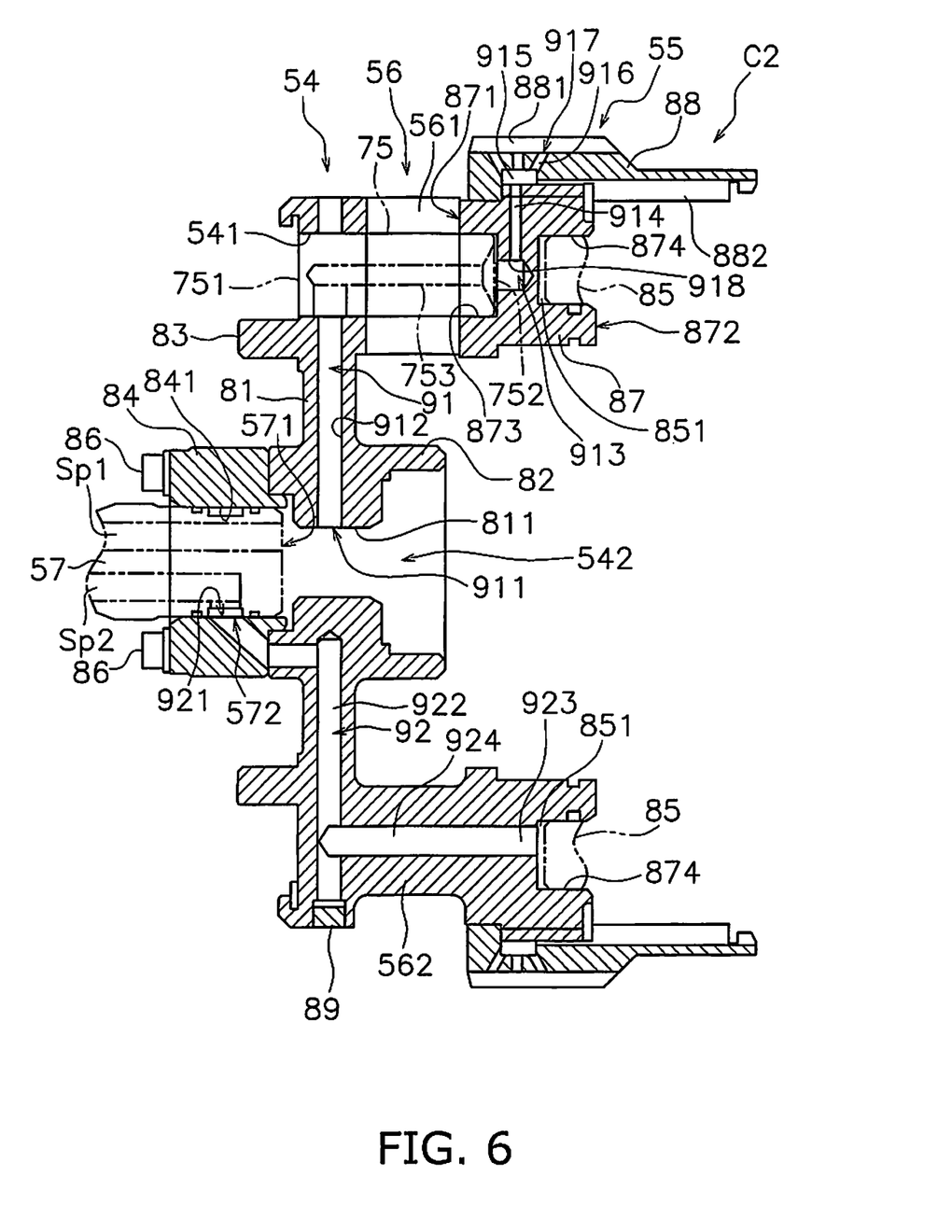
FIG. 6 is an enlarged diagram of a cross section of a portion of a transmission.

The structure of the second carrier C2 will be described next. FIG. 6 is a cross sectional diagram of the second carrier C2. The second carrier C2 has a circular plate section 54, a cylinder section 55, and a planetary gear arrangement section 56 as shown in FIG. 6.

The circular plate section 54 is arranged concentrically with the shafts of the first planetary gear mechanism 68 and the second planetary gear mechanism 69. The circular plate section 54 has a plurality of first support sections 541 for supporting one end of the second support pin 75 of the second planetary gear P2 (referred to below as a "first end section 751"). The first support sections 541 are holes which are provided in the circular plate section 54. The first support sections 541 penetrate through the circular plate section 54 in the axial direction. The first end section 751 of the second support pin 75 is inserted in the first support sections 541. The circular plate section 54 has a central hole 542, which penetrates through the circular plate section 54, at the center of the circular plate section 54.

In detail, the circular plate section 54 has a circular plate main body section 81, a first flange section 82, a second flange section 83, and a third cylinder section 84. The circular plate main body section 81 has the first support sections 541 described above. The first flange section 82 protrudes in the axial direction from the circular plate main body section 81 toward the first planetary gear mechanism 68. A first shaft bearing B1 (refer to FIG. 5) which supports the second carrier C2 is attached to the first flange section 82. The outer diameter of the first flange section 82 is smaller than the outer diameter of the second flange section 83.

The second flange section 83 protrudes in the axial direction from the circular plate main body section 81 toward a direction which is the opposite to the direction which is toward the first planetary gear mechanism 68. A second shaft bearing B2 (refer to FIG. 5) which supports the second carrier C2 is attached to the second flange section 83. The second flange section 83 is arranged more to the inner diameter side than the first support sections 541.

The third cylinder section 84 protrudes in the axial direction from the circular plate main body section 81 toward a direction which is the opposite to the direction which is toward the first planetary gear mechanism 68. The third cylinder section 84 is arranged concentrically with the circular plate main body section 81. The third cylinder section 84 is a separate body to the circular plate main body section 81 and is fixed to the circular plate main body section 81 using a fixing member 86, such as a bolt. The central hole 542 described above has a first hole section 811 which is provided in the circular plate main body section 81 and a second hole section 841 which is provided in the third cylinder section 84. The first hole section 811 and the second hole section 841 are arranged concentrically and are linked to each other. An end section of the intermediate shaft 67 (refer to FIG. 5) is inserted in the first hole section 811. A shaft member 57 is inserted in the second hole section 841. A first supply flow path Sp1 and a second supply flow path Sp2 are provided in an inner section of the shaft member 57 to supply hydraulic fluid.

The cylinder section 55 is arranged to be separated from the circular plate section 54 in the axial direction of the circular plate section 54. The cylinder section 55 is arranged concentrically with the circular plate section 54. The cylinder section 55 has a first cylinder section 87 and a second cylinder section 88. The first cylinder section 87 and the second cylinder section 88 are separate bodies.

The first cylinder section 87 is connected with the planetary gear arrangement section 56. The first cylinder section 87 has a first end surface 871 and a second end surface 872 which are orthogonal to the axial direction. The first cylinder section 87 includes a plurality of second support sections 873 and a piston attachment section 874. The second support sections 873 support the other end of the second support pin 75 of the second planetary gear P2 (referred to below as a "second end section 752"). The second support sections 873 are provided at the first end surface 871. The second support sections 873 have a shape which is recessed from the first end surface 871. The second end section 752 is inserted in the second support sections 873. The second piston 85 is attached to the piston attachment section 874. The piston attachment section 874 is provided at the second end surface 872. The piston attachment section 874 has a shape which is recessed from the second end surface 872. An end section of the second piston 85 is inserted in the piston attachment section 874. A hydraulic fluid chamber 851 is formed between the piston attachment section 874 and an end section of the second piston 85.

The second cylinder section 88 is arranged concentrically with the first cylinder section 87. The second cylinder section 88 is connected with the first cylinder section 87. The second cylinder section 88 is arranged on the outside of the first cylinder section 87 in the radial direction. The inner circumference of the second cylinder section 88 is connected with the outer circumference of the first cylinder section 87. The second cylinder section 88 is longer than the first cylinder section 87 in the axial direction. The second cylinder section 88 protrudes in the axial direction from the second end surface 872 of the first cylinder section 87 in a direction which is toward the first planetary gear mechanism 68. The second cylinder section 88 has a first clutch attachment section 881 and a second clutch attachment section 882. The second piston 85 is arranged on the inside of the second cylinder section 88 in the radial direction.

The first clutch CL is attached to the first clutch attachment section 881. The second clutch CH is attached to the second clutch attachment section 882. The first clutch attachment section 881 is provided on the outer circumference of the second cylinder section 88. In detail, the first clutch attachment section 881 is a plurality of grooves (splines) which extends in the axial direction and is where the plurality of clutch plates of the first clutch CL are attached. The second clutch attachment section 882 is provided on the inner circumference of the second cylinder section 88. In detail, the second clutch attachment section 882 is a plurality of grooves (splines) which extends in the axial direction and is where the plurality of clutch plates of the second clutch CH are attached. The first clutch attachment section 881 is arranged on the outside of the first cylinder section 87 in the radial direction. The second clutch attachment section 882 lines up with the second end surface 872 of the first cylinder section 87 in the axial direction.

The planetary gear arrangement section 56 is arranged between the circular plate section 54 and the cylinder section 55 in the axial direction. In detail, the planetary gear arrangement section 56 is arranged between the circular plate main body section 81 and the first cylinder section 87 in the axial direction. The planetary gear arrangement section 56 has a space 561 where the second planetary gear P2 is arranged and a linking section 562 which links the circular plate section 54 and the cylinder section 55. The first flange section 82 described above is arranged on the inside of the planetary gear arrangement section 56 in the radial direction.

The second carrier C2 has a first hydraulic fluid flow path 91 and a second hydraulic fluid flow path 92. The first hydraulic fluid flow path 91 is a flow path for supplying hydraulic fluid, which is for lubricating the first clutch CL, to the first clutch attachment section 881. The second hydraulic fluid flow path 92 is a flow path for supplying hydraulic fluid, which is for driving the second piston 85, to the piston attachment section 874.

The first hydraulic fluid flow path 91 is provided in an inner section of the circular plate section 54 and the cylinder section 55. The first hydraulic fluid flow path 91 has a first inlet 911 which is provided in the circular plate section 54. The first inlet 911 is provided in an inner surface of the central hole 542 in the circular plate section 54. In detail, the first inlet 911 is provided in the first hole section 811 in the circular plate main body section 81.

The first hydraulic fluid flow path 91 has a first upstream side flow path 912 and a first downstream side flow path 913. The first upstream side flow path 912 is provided in an inner section of the circular plate section 54 and connects the first inlet 911 and the first support sections 541. The first downstream side flow path 913 is provided in an inner section of the cylinder section 55. The first upstream side flow path 913 connects the second support sections 873 and the first clutch attachment section 881. A flow path 753 for hydraulic fluid is provided in an inner section of the second support pin 75. The flow path 753 in the second support pin 75 connects the first upstream side flow path 912 and the first downstream side flow path 913. Hydraulic fluid, which is for lubricating the clutch, is supplied from the first inlet 911 to the first clutch attachment section 881 via the first hydraulic fluid flow path 91.

The first downstream side flow path 913 has a connecting flow path 918, a first flow path 914, a merging flow path 915, a plurality of second flow paths 916, and a plurality of outlets 917. Here, the reference numeral 916 is only given to one of the plurality of second flow paths 916 in FIG. 6 and the reference numerals for the other second flow paths are omitted. In addition, the reference numeral 917 is only given to one of the plurality of outlets 917 and the reference numerals for the other outlets are omitted.

The connecting flow path 918 is connected with the second support sections 873. The connecting flow path 918 extends in the axial direction. The diameter of the connecting flow path 918 is larger than the diameter of the first flow path 914. The first flow path 914 extends from the connecting flow path 918 in the radial direction of the cylinder section 55. The first flow path 914 connects the second support sections 873 and the merging flow path 915. The merging flow path 915 extends in the circumferential direction of the cylinder section 55. The merging flow path 915 is provided on the inner circumference of the second cylinder section 88. The plurality of second flow paths 916 connect the merging flow path 915 and the plurality of outlets 917. The plurality of outlets 917 are provided on the outer circumference of the second cylinder section 88. The plurality of outlets 917 are connected with the first clutch attachment section 881.

The second hydraulic fluid flow path 92 is provided at inner sections of the circular plate section 54, the linking section 562 of the planetary gear arrangement section 56, and the cylinder section 55. The second hydraulic fluid flow path 92 has a second inlet 921 which is provided in the circular plate section 54. The second inlet 921 is provided in the inner surface of the central hole 542 in the circular plate section 54. In detail, the second inlet 921 is provided in the second hole section 841 in the third cylinder section 84. Accordingly, the first inlet 911 and the second inlet 921 are arranged to be separated from each other in the axial direction of the second carrier C2. Hydraulic fluid, which is for driving the second piston 85, is supplied from the second inlet 921 to the piston attachment section 874 via the second hydraulic fluid flow path 92.

The second hydraulic fluid flow path 92 has a second upstream side flow path 922, a second downstream side flow path 923, and an intermediate flow path 924. The second upstream side flow path 922 is provided in an inner section of the circular plate section 54. The second upstream side flow path 922 is connected with the second inlet 921. The second downstream side flow path 923 is provided in an inner section of the cylinder section 55. The second downstream side flow path 923 is connected with the piston attachment section 874. That is, the second downstream side flow path 923 is connected with the hydraulic fluid chamber 851 between the piston attachment section 874 and the second piston 85. The intermediate flow path 924 is provided in an inner section of the linking section 562. The intermediate flow path 924 connects the second upstream side flow path 922 and the second downstream side flow path 923.

Here, the first upstream side flow path 912 and the second upstream side flow path 922 both reach the outer circumference of the second carrier C2. The second upstream side flow path 922 is closed by a plug 89 at the outer circumference of the second carrier C2. Accordingly, it is possible to prevent leaking of hydraulic fluid from the second upstream side flow path 922 even when the first upstream side flow path 912 and the second upstream side flow path 922 are formed using processing, such as drill processing, from the outer circumference of the second carrier C2. Due to this, it is possible to suppress effects on the operations of the second piston 85. On the other hand, the first upstream side flow path 912 needs not be closed by a plug. Leaking of hydraulic fluid from the first upstream side flow path 912 is suppressed by the second support pin 75. In addition, hydraulic fluid which flows in the first upstream side flow path 912 is used in lubricating and no problems occur since hydraulic fluid which flows in the first upstream side flow path 912 is retained inside the housing 28 even with leaks to the outside of the second carrier C2.

As described above, the shaft member 57 is inserted in the second hole section 841. The first supply flow path Sp1 and the second supply flow path Sp2 in the shaft member 57 are not connected to each other and are provided to be independent. The shaft member 57 has a first outlet 571 and a second outlet 572. The first outlet 571 is connected with the first supply flow path Sp1. The first outlet 571 is provided in the shaft member 57 at an end surface in the axial direction. The second outlet 572 is connected with the second supply flow path Sp2. The second outlet 572 is provided on the outer circumference of the shaft member 57. The first outlet 571 is connected with the first inlet 911 via a space inside the first hole section 811 due to the shaft member 57 being attached to the second hole section 841. In addition, the second outlet 572 is connected with the second inlet 921. Hydraulic fluid, which has a pressure which is appropriate for lubricating the clutch, is supplied to the first inlet 911 via the first supply flow path Sp1. In addition, hydraulic fluid, which has a pressure which is for controlling driving of the second piston 85, is supplied to the second inlet 921 via the second supply flow path Sp2.

The working vehicle 1 according to the exemplary embodiments of the present embodiment has the following characteristics.

The second carrier C2 supports not only the first clutch CL and the second clutch CH but also supports the second piston 85. For this reason, it is possible for the transmission 24 to be reduced in size and it is possible to simplify the structure of the transmission 24 compared to a case where the second piston 85 has a support structure which is separate to the second carrier C2 and which is provided in the vicinity of the second carrier C2.

In addition, it is possible for the second hydraulic fluid flow path 92, which is for driving the second piston 85, to be provided in an inner section of the second carrier C2 since the second carrier C2 has the piston attachment section 874. Furthermore, it is possible for the first hydraulic fluid flow path 91, which is for lubricating the first clutch CL, to be provided in an inner section of the second carrier C2 since the second carrier C2 has the first clutch attachment section 881. Due to this, it is possible to simplify the structure of the transmission 24 and it is possible to improve ease of assembly of the transmission 24.

Furthermore, the first inlet 911 and the second inlet 921 are both provided in the circular plate section 54. That is, the first inlet 911 and the second inlet 921 are arranged on the opposite side with regard to the planetary gear arrangement section 56 and not in the cylinder section 55 to which the first clutch CL, the second clutch CH, and the second piston 85 are attached. For this reason, it is possible to easily arrange the shaft member 57 for supplying hydraulic fluid to the first inlet 911 and the second inlet 921 by avoiding interference with the first clutch CL, the second clutch CH, the second piston 85, and the second sun gear S2 or with components such as the first carrier C1.

The first inlet 911 and the second inlet 921 are arranged to be separated from each other in the axial direction of the second carrier C2. Due to this, it is possible to easily connect the hydraulic circuits in the separate systems with the first inlet 911 and the second inlet 921. That is, it is possible to easily connect the hydraulic circuit which is for lubricating the first clutch CL and the hydraulic circuit which is for driving the second piston 85 respectively with the first inlet 911 and the second inlet 921.

The first inlet 911 and the second inlet 921 are provided at an inner surface of the central hole 542 in the circular plate section 54. For this reason, since the shaft member 57 passes through the central hole 542, it is possible for hydraulic fluid to be supplied to the first inlet 911 and the second inlet 921 via the first supply flow path Sp1 and the second supply flow path Sp2 inside the shaft member 57.

Hydraulic fluid is efficiently sent to the merging flow path 915 in the first hydraulic fluid flow path 91 using the centrifugal force of the second carrier C2 since the first flow path 914 extends in the radial direction of the cylinder section 55. Hydraulic fluid is sent to the plurality of second flow paths 916 by being dispersed in the merging flow path 915. Then, hydraulic fluid is supplied from each of the plurality of second flow paths 916 to the first clutch CL via the plurality of outlets 917. Due to this, it is possible to uniformly supply hydraulic fluid to the first clutch CL over a wide range.

The piston attachment section 874 is provided on the second end surface 872 of the first cylinder section 87. The first clutch attachment section 881 is provided on the outer circumference of the second cylinder section 88. The second clutch attachment section 882 is provided on the inner circumference of the second cylinder section 88. In this case, it is possible for the first clutch CL, the second clutch CH, and the second piston 85 to be arranged in a compact manner in the vicinity of the second carrier C2.

The first cylinder section 87 and the second cylinder section 88 are separate bodies. In this case, it is possible for manufacturing to be easy even if the shape of the second carrier C2 becomes complicated.

One exemplary embodiment of the present invention is described above but the present invention is not limited to the exemplary embodiment described above and various modifications are possible within a scope which does not depart from the gist of the invention.

The working vehicle is not limited to a wheel loader and may be other types of vehicles, such as a motor grader or a hydraulic excavator.

The exemplary embodiments of the present invention are not limited to an electro-mechanical transmission (EMT) and may be applied to a different type of transmission, such as a hydro-mechanical transmission (HMT). For example, in an HMT, the first motor MG1 functions as a hydraulic motor and a hydraulic pump. The second motor MG2 functions as a hydraulic motor and a hydraulic pump. In addition, the third motor MG3 functions as a hydraulic motor and a hydraulic pump. The first motor MG1, the second motor MG2, and the third motor MG3 are pumps or motors with variable capacities and the capacities are controlled using the control section 31. Alternatively, the exemplary embodiments of the present invention may be applied to a transmission which is not provided in a motor.

The configuration of the transmission 24 is not limited to the configuration in the exemplary embodiment described above. For example, the shape, linking, and arrangement of each element in the two planetary gear mechanisms 68 and 69 are not limited to the shape, linking, and arrangement in the exemplary embodiment described above. The number of the planetary gear mechanisms is not limited to two and may be three or more. The number of the motors is not limited to three and may be two or less or may be four or more. For example, the third motor MG3 may be omitted.

The shape of the second carrier C2 is not limited to the shape in the exemplary embodiment described above and may be modified. The arrangement of the first hydraulic fluid flow path 91 and/or the second hydraulic fluid flow path 92 may be modified. The first cylinder section 87 and the second cylinder section 88 may be an integral body.

According to the exemplary embodiments of the present invention, it is possible to propose a carrier, a planetary gear mechanism, and a working vehicle where it is possible to improve ease of assembly by complicating of the structure of a transmission being suppressed while also reducing the size of the transmission.

The invention claimed is:

1. A carrier configured to have a first clutch and a second clutch attached thereto, and configured to support a planetary gear in a planetary gear mechanism, the carrier comprising:
    a circular plate section including a first support section configured to support one end of a support pin of the planetary gear;
    a cylinder section arranged to be separated from the circular plate section in an axial direction of the circular plate section, the cylinder section including
        a second support section configured to support the other end of the support pin of the planetary gear,
        a first clutch attachment section for attaching to the first clutch,
        a second clutch attachment section for attaching to the second clutch, and
        a piston attachment section for attaching to a piston for driving the second clutch;
    a planetary gear arrangement section arranged between the circular plate section and the cylinder section in the axial direction, the planetary gear arrangement section including a space in which the planetary gear is arranged;
    a first hydraulic fluid flow path provided at an inner section of the circular plate section and the cylinder section, the first hydraulic fluid flow path supplying hydraulic fluid, which is for lubricating the first clutch, from the first inlet to the first clutch attachment section, the first hydraulic fluid path including
        a first inlet provided in the circular plate section,
        a plurality of outlets connected with the first clutch attachment section,
        a first flow path extending in a radial direction of the cylinder section,
        a merging flow path connected with the first flow path, the merging flow path extending in a circumferential direction of the cylinder section, and
        a plurality of second flow paths connecting the merging flow path and the plurality of outlets; and
    a second hydraulic fluid flow path including a second inlet which is provided in the circular plate section, the second hydraulic fluid flow path being provided at an inner section of the circular plate section and the cylinder section, the second hydraulic fluid flow path supplying hydraulic fluid, which is for driving the piston, from the second inlet to the piston attachment section.

2. The carrier according to claim 1, wherein the first inlet and the second inlet are arranged to be separated from each other in the axial direction of the carrier.

3. The carrier according to claim 2, wherein the circular plate section includes a hole which penetrates through the circular plate section at a center of the circular plate section, and
at least one of the first inlet and the second inlet is provided at an inner surface of the hole.

4. The carrier according to claim 3, wherein the first hydraulic fluid flow path includes
    a first upstream side flow path provided in an inner section of the circular plate section, the first upstream side flow path connecting the first inlet and the first support section, and
    a first downstream side flow path provided in an inner section of the cylinder section, the first downstream side flow path connecting the second support section and the first clutch attachment section.

5. The carrier according to claim 4, wherein the planetary gear arrangement section includes a linking section which links the circular plate section and the cylinder section, and
the second hydraulic fluid flow path has
    a second upstream side flow path provided in an inner section of the circular plate section, the second upstream side flow path being connected with the second inlet,
    a second downstream side flow path provided in an inner section of the cylinder section, the second downstream side flow path being connected with the piston attachment section, and
    an intermediate flow path provided in an inner section of the linking section, the intermediate flow path connecting the second upstream side flow path and the second downstream side flow path.

6. The carrier according to claim 5, wherein the cylinder section has
    a first cylinder section including the second support section and the piston attachment section, and
    a second cylinder section connected with the first cylinder section,
the first clutch attachment section is provided on an outer circumference of the second cylinder section, and
the second clutch attachment section is provided on an inner circumference of the second cylinder section.

7. The carrier according to claim 6, wherein the first cylinder section and the second cylinder section are separate bodies.

8. A planetary gear mechanism comprising:
a sun gear;
the planetary gear, the planetary gear engaging with the sun gear;
the carrier according to claim 7, the carrier supporting the planetary gear; and
a ring gear engaging with the planetary gear, the ring gear being provided to be rotatable.

9. A transmission comprising:
the first clutch;
the second clutch; and
the planetary gear mechanism according to claim 8.

10. A working vehicle comprising:
an engine;
a hydraulic pump driven by the engine;
a working implement driven by hydraulic fluid which is discharged from the hydraulic pump;
a travel apparatus driven by a drive force from the engine; and
the transmission according to claim 9, the transmission transferring the drive force from the engine to the travel apparatus.

11. The carrier according to claim 1, wherein the circular plate section includes a hole which penetrates through the circular plate section at a center of the circular plate section, and
at least one of the first inlet and the second inlet is provided at an inner surface of the hole.

12. The carrier according to claim 1, wherein the first hydraulic fluid flow path includes
    a first upstream side flow path provided in an inner section of the circular plate section, the first upstream side flow path connecting the first inlet and the first support section, and
a first downstream side flow path provided in an inner section of the cylinder section, the first downstream side flow path connecting the second support section and the first clutch attachment section.

13. The carrier according to claim 1, wherein
the planetary gear arrangement section including includes
a linking section which links the circular plate section and the cylinder section, and
the second hydraulic fluid flow path has
a second upstream side flow path provided in an inner section of the circular plate section, the second upstream side flow path being connected with the second inlet,
a second downstream side flow path provided in an inner section of the cylinder section, the second downstream side flow path being connected with the piston attachment section, and
an intermediate flow path provided in an inner section of the linking section, the intermediate flow path connecting the second upstream side flow path and the second downstream side flow path.

14. The carrier according to claim 1, wherein
the cylinder section has
a first cylinder section including the second support section and the piston attachment section, and
a second cylinder section connected with the first cylinder section,
the first clutch attachment section is provided on an outer circumference of the second cylinder section, and
the second clutch attachment section is provided on an inner circumference of the second cylinder section.

15. The carrier according to claim 14, wherein
the first cylinder section and the second cylinder section are separate bodies.

16. A planetary gear mechanism comprising:
a sun gear;
the planetary gear, the planetary gear engaging with the sun gear;
the carrier according to claim 1, the carrier supporting the planetary gear; and
a ring gear engaging with the planetary gear, the ring gear being provided to be rotatable.

17. A transmission comprising:
the first clutch;
the second clutch; and
the planetary gear mechanism according to claim 16.

18. A working vehicle comprising:
an engine;
a hydraulic pump driven by the engine;
a working implement driven by hydraulic fluid which is discharged from the hydraulic pump;
a travel apparatus driven by a drive force from the engine; and
the transmission according to claim 17, the transmission transferring the drive force from the engine to the travel apparatus.

* * * * *